US011010022B2

(12) United States Patent
Alvi et al.

(10) Patent No.: US 11,010,022 B2
(45) Date of Patent: May 18, 2021

(54) GLOBAL EVENT-BASED AVATAR

(71) Applicant: Snap Inc., Santa Monica, CA (US)

(72) Inventors: Sumbul Alvi, Astoria, NY (US); David Mark, Toronto (CA); Kimberly A. Phifer, Brooklyn, NY (US); Graham Reid, Brooklyn, NY (US); Suraj Vindana Samaranayake, New York, NY (US); Alexandre Valdetaro Porto, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/845,360

(22) Filed: Apr. 10, 2020

(65) Prior Publication Data
US 2020/0249804 A1    Aug. 6, 2020

Related U.S. Application Data

(63) Continuation of application No. 16/269,294, filed on Feb. 6, 2019, now Pat. No. 10,656,797.

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04845* (2013.01); *G06F 16/90335* (2019.01); *H04L 51/32* (2013.01)

(58) Field of Classification Search
CPC ............. G06F 3/0482; G06F 16/90335; G06F 3/04845; H04L 51/32
(Continued)

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"U.S. Appl. No. 16/269,294, Notice of Allowance dated Jan. 10, 2020", 5 pgs.

(Continued)

*Primary Examiner* — David Phantana-angkool
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for navigating an avatar based on time zones. A global event is identified that begins at a particular time on a given date; a sequential list of time zones associated with a plurality of geographical locations is retrieved; and a current time at a first time zone of the sequential list of time zones is determined to have reached the particular time on the given date. In response, an avatar is generated for display on a map at a first of the plurality of geographical locations associated with the first time zone and is navigated to a second geographical location when a current time at a second time zone, associated with the second geographical location, reaches the particular time on the given date.

20 Claims, 11 Drawing Sheets

(51) Int. Cl.
*G06F 16/903* (2019.01)
*H04L 12/58* (2006.01)
*G06F 3/0484* (2013.01)

(58) Field of Classification Search
USPC ........................................................ 715/719
See application file for complete search history.

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,628,446 B2 * | 4/2017 | Bosnic, Jr. | H04L 63/0407 |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,967,630 B2 * | 5/2018 | Chai | H04N 21/25841 |
| 9,980,100 B1 | 5/2018 | Charlton et al. | |
| 9,990,373 B2 | 6/2018 | Fortkort | |
| 9,992,449 B1 * | 6/2018 | Ashkenazi | H04N 5/2259 |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,346,411 B1 | 7/2019 | Deselaers et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,616,727 B2 * | 4/2020 | Constantinides | H04L 51/32 |
| 10,656,797 B1 * | 5/2020 | Alvi | H04L 51/20 |
| 10,657,701 B2 | 5/2020 | Osman et al. | |
| 10,721,609 B1 * | 7/2020 | Blythe | H04L 67/18 |
| 10,880,246 B2 * | 12/2020 | Baldwin | H04L 51/063 |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0110105 A1 | 5/2010 | Kinnunen et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0054631 A1 * | 3/2012 | Nurmi | G06F 3/0481 715/744 |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |

(56) References Cited

U.S. PATENT DOCUMENTS

| | | |
|---|---|---|
| 2013/0332068 A1 | 12/2013 | Kesar et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0221089 A1 | 8/2014 | Fortkort |
| 2015/0169142 A1 | 6/2015 | Longo et al. |
| 2015/0206349 A1 | 7/2015 | Rosenthal et al. |
| 2015/0245168 A1 | 8/2015 | Martin |
| 2016/0134840 A1 | 5/2016 | Mcculloch |
| 2016/0234149 A1 | 8/2016 | Tsuda et al. |
| 2016/0350297 A1 | 12/2016 | Riza |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen Dennis et al. |
| 2017/0243403 A1* | 8/2017 | Daniels .................. G06T 19/20 |
| 2017/0310934 A1 | 10/2017 | Du et al. |
| 2017/0312634 A1 | 11/2017 | Ledoux Laic et al. |
| 2018/0047200 A1 | 2/2018 | O'hara et al. |
| 2018/0088777 A1 | 3/2018 | Daze et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1* | 11/2018 | Amitay .................. A63F 13/79 |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0376792 A1 | 12/2019 | Chen et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

U.S. Appl. No. 16/269,294, filed Feb. 6, 2019, Global Event-Based Avatar
U.S. Pat. No. 10,656,797, Alvi et al.

* cited by examiner

GLOBAL EVENT-BASED AVATAR

CLAIM OF PRIORITY

This application is a continuation of U.S. patent application Ser. No. 16/269,294, filed on Feb. 6, 2019, which is incorporated herein by reference in its entirety.

TECHNICAL FIELD

The present disclosure relates generally to map-based graphical user interfaces.

BACKGROUND

Social network platforms continue to grow globally. Users of these platforms constantly seek new ways to connect with their friends across the globe. One way users try to connect with their friends involves exchanging messages at the beginning of a shared special event or holiday, such as at midnight on New Year's Day. However, because a given user's friends can be scattered throughout the globe in different countries and time zones, figuring out exactly when the special event or holiday begins in a given country, where the given user's friend lives, can be challenging.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
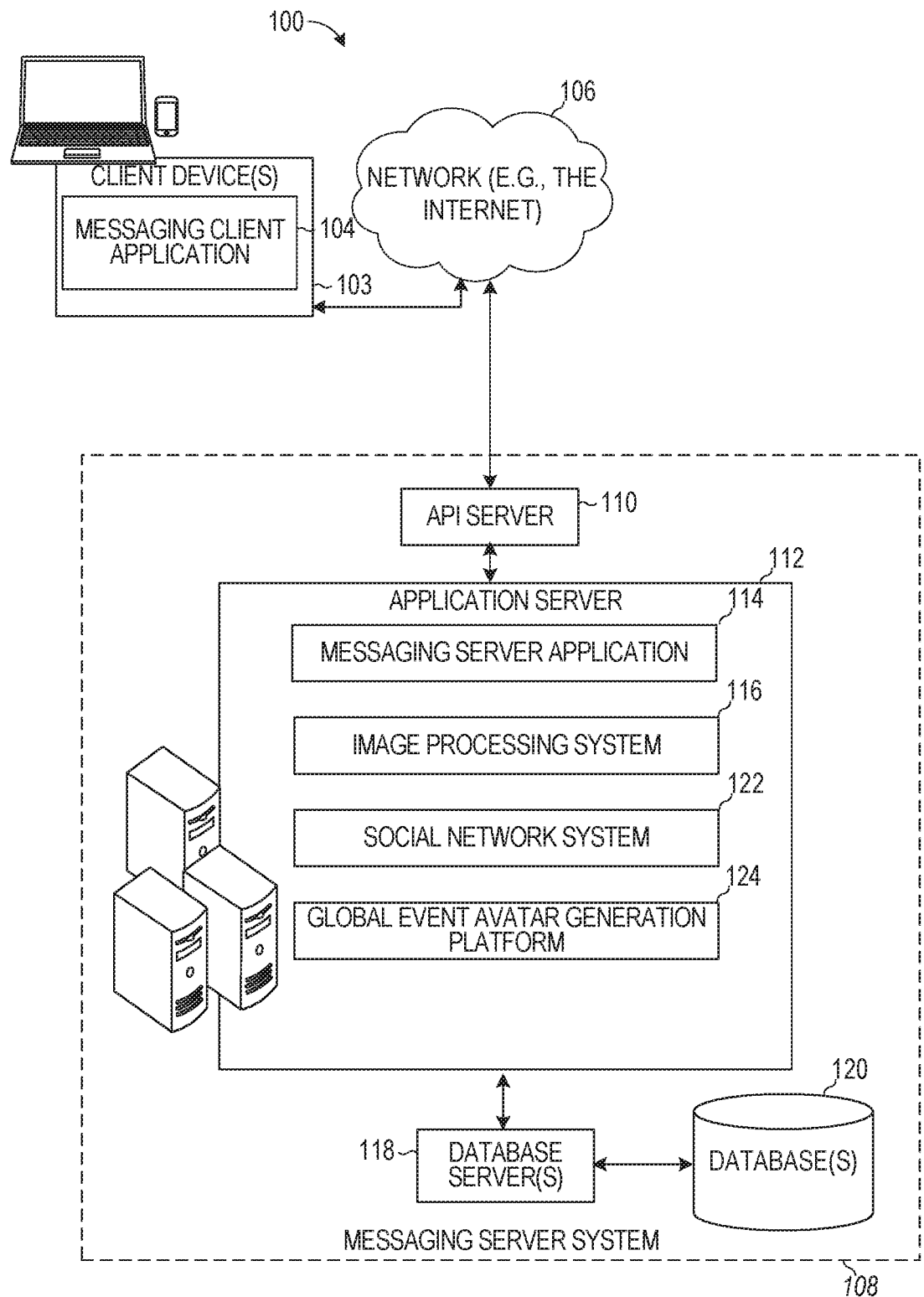
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

One of the challenges users experience when they try to connect with each other across different time zones and countries throughout the globe is finding the right time to send each other messages in relation to when a shared global event begins. For example, a given user who lives in New York may wish to send a message indicating "Happy New Year" to their friend who lives in Australia when the New Year begins in Australia. Specifically, the given user may wish to send the message to their friend when the current time in Australia is 12 AM on New Year's Day (Jan. 1, 2019) while the current time in New York (where the given user lives) is still 8 AM on New Year's Eve (the previous day, Dec. 31, 2018). Figuring out when the current time in Australia, where the given user's friend lives, is 12 AM on New Year's Day, to accurately time-deliver the message, is not trivial.

One way to determine when the current time in a particular country or time zone reaches a desired time involves using a day night map. Such a map indicates where it is currently day or night. To determine the current time in the particular country based on the day night map, the user has to take into account the latitude and longitude degree of the particular country, and the sun's location. Using the latitude and longitude degree and sun location together with the current time in the user's location, the user can manually compute the current time in the particular country. This approach is very time consuming, not intuitive and difficult to use which ends up providing inaccurate times.

Another way a user can determine the time in a particular country is using a time zone map that breaks up different regions into their respective time zones. Using this map, the user has to find the time zone of interest that is associated with the particular country and then determine the current time in the particular country based on the user's own time and the time zone of that country. While this approach works well for computing the current time in a given country, this approach is also very time consuming, not intuitive, and does not scale well in cases where the user has friends in multiple countries.

Finally, users can also use a search engine to query what the current time is in a particular country. While this approach works well for determining the current time in a given country at a discrete moment of the user's query, determining when the current time in a particular country or time zone reaches a desired time (e.g., the start time of global event) involves performing multiple searches multiple times until the search engine results indicate that the current time has reached the desired time. Alternatively, the user can remember based on the results of the query how far ahead or behind the current time is in a particular country relative to the current time at the user's location. Then, the user has to re-compute the current time based on the user's memory to determine when the current time in the particular country or time zone reaches a desired time. Such an approach is also very time consuming, not intuitive, and does not scale well in cases where users have friends in multiple countries. Particularly, this process is very inefficient, requires navigation through many pages of content, can take a great deal of time, and may still end up missing the right time for sending messages to the user's friends, resulting in a poor user experience and reduced efficiency.

The disclosed embodiments improve the efficiency of using an electronic device by presenting an avatar on a map that indicates when a particular country or geographical location or region reaches the beginning of a shared global event. Specifically, the disclosed embodiments identify a global event that begins at a particular time on a given date. Time zones associated with respective geographical locations or regions are retrieved to determine when the current time at a first time zone has reached the particular time on the given date. When the current time at the first time zone reaches the particular time on the given date, an avatar (e.g., a blimp) is displayed on a map at the first geographical location corresponding to the first time zone. The avatar follows a path through the geographical locations and is navigated from the first geographical location to a second geographical location according to the path when a current time at a second time zone reaches the particular time on the given date. In this way, by simply accessing the map that presents the avatar at the geographical location where the current time has reached or passed the particular time associated with the global event, a user can quickly determine where the global event has begun. Also, by simply accessing the map, the user can determine how close or far along the path the avatar is to an additional geographical location of interest, which informs the user how much longer or how much more time remains before the global event begins at the additional geographical location of interest.

This significantly improves how users interact, connect with each other, and exchange messages on a social media platform. Particularly, this significantly improves the user experience, reduces the number of steps a user has to perform to determine what the current time is in a particular country and when to send messages to their friends, and makes interacting with friends and using the social media platform more enjoyable. This is because the user can determine the current time in the country in which the user's friends live (or how soon a particular time associated with a shared global event will be reached by the country in which the user's friends live) without actually searching for, manually computing, and opening up different interfaces to determine the current time in the particular country of interest. Rather than paging through multiple screens of maps, search engine results, and menus to determine when a given country reaches a given time on a given date associated with a shared global event, only a few steps may be needed from global event avatar map interface to connect with and determine when the shared global event starts in a given country. Specifically, the disclosed embodiments allow graphic illustration of event timing on a map-based interactive interface for a social media platform.

FIG. 1 is a block diagram showing an example messaging system 100 for exchanging data (e.g., messages and associated content) over a network 106. The messaging system 100 includes multiple client devices 103, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104 and between a messaging client application 104 and the messaging server system 108 includes functions (e.g., commands to invoke functions) as well as payload data (e.g., text, audio, video, or other multimedia data).

Each messaging client application 104 is also able to communicate with global event avatar generation platform 124. Global event avatar generation platform 124 presents an avatar (e.g., a blimp) on a map over a given geographical region where a global event has most recently begun. The global event avatar generation platform 124 navigates the avatar along a path from one geographical region to another as time progresses so that the avatar reaches the next geographical region or location when the global event begins at that next geographical region or location. Specifically, based on time zones associated with the various geographical regions or locations (regions and locations are used interchangeably throughout and should be understood to mean the same thing), the global event avatar generation platform 124 can determine the current time at the different locations and compare that current time to a start time (e.g., midnight) of the global event (e.g., New Year's Day).

The global event avatar generation platform 124 also receives a selection of the avatar from a given client application 104 and, in response, presents to the client application 104 a list of videos or clips transmitted by users to the global event avatar generation platform 124 from geographical regions where the global event has begun. For example, once the global event has begun in a given geographical region, the messaging client application 104 generates a video of people at that location and uploads the video to global event avatar generation platform 124. A user of the messaging client application 104 at another geographical location where the event has or has not yet begun, can view this video uploaded by the user in the given geographical location by selecting the avatar that is displayed on the map. The user of the messaging client application 104 is provided with a list of friends at the geographical location at the current position of the avatar in response to the user selecting the avatar. Based on the displayed list of friends, the user can select some or all of the friends in that specified geographical region to send a message (e.g., a "Happy New Year's" message).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 103 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 103 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 103; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and global event avatar generation platform 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by global event avatar generation platform 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users or videos of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
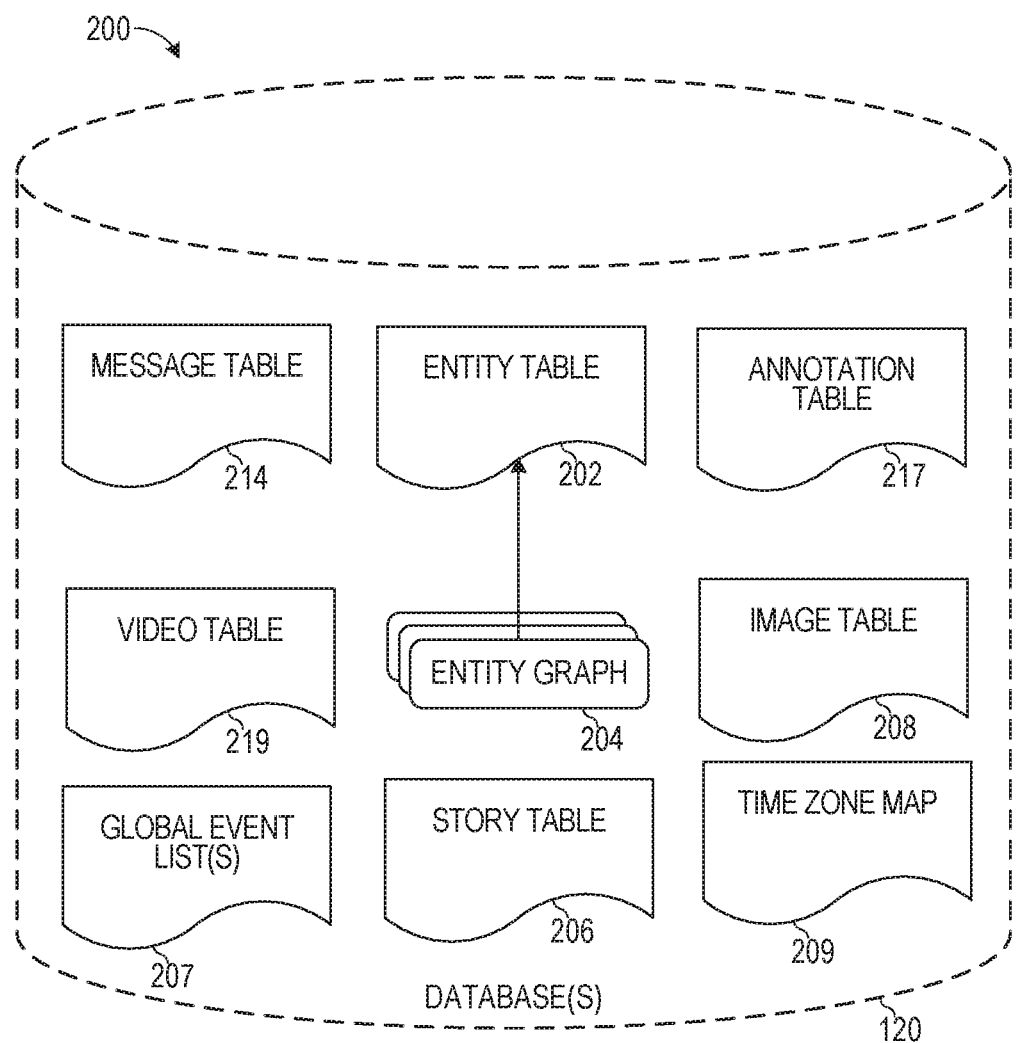
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 217. Database 120 also stores annotated content received in the annotation table 217. Filters for which data is stored within the annotation table 217 are associated with and applied to videos (for which data is stored in a video table 219) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 103. Another type of filter is a data filter, which may be selectively presented to a sending user by the messaging client application 104, based on other inputs or information gathered by the client device 103 during the message creation process. Examples of data filters include current temperature at a specific location, a current speed at which a sending user is traveling, battery life for a client device 103, or the current time.

Other annotation data that may be stored within the image table 208 is so-called "lens" data. A "lens" may be a real-time special effect and sound that may be added to an image or a video.

As mentioned above, the video table 219 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 217 with various images and videos stored in the image table 208 and the video table 219. This may be done by storing unique video identifiers with the various annotations to identify the video associated with the annotations.

Global event list(s) 207 stores data representing various global events of the global event avatar generation platform 124. Global event list(s) 207 provide the starting time and date data of each event, which the global event avatar generation platform 124 uses to display an avatar on a map representing where a given one of the global events has begun. For example, global event list(s) 207 stores a first global event (e.g., New Year's Day) with corresponding start time (e.g., midnight) and date (e.g., every January 1 of a given year). As another example global event list(s) 207 stores a second global event (e.g., Christmas) with corresponding start time (e.g., midnight) and date (e.g., December 25 of a given year). As another example global event list(s) 207 stores a third global event (e.g., Hanukah) with corresponding start time (e.g., sunset time on a day previous to the start date of the event) and start date (e.g., a specified lunar day of a given year which varies in the Gregorian calendar from one year to the next). Global event list(s) 207 stores any number of global events with their corresponding start times and dates including any holiday celebrated worldwide, Easter, Good Friday, a religious holiday, or a secular holiday. In an embodiment, a user can input a global event into the global event list(s) 207 by manually specifying a name for the event, a visual attribute of the event (used to generate the avatar), a start time and start date for the event. In some embodiments, the start times of the global events stored in the global event list(s) 207 are with respect to the Coordinated Universal Time (UTC) (e.g., the start times indicate the start time of the event in the UTC time having a zero offset).

In some embodiments, the global event avatar generation platform 124 presents multiple avatars each associated with a different one of the global events simultaneously and in different states on the map. Each avatar may have visual features that represent the event associated with the avatar. In some embodiments, the global event avatar generation platform 124 presents each avatar associated with a different global event on a respective map such that only one avatar is presented on a map dedicated to a specified global event. The user may be provided with an interface for selecting a map that presents a single avatar associated with a user-selected one of the events in the global event list(s) 207. The user may also be provided with an option to cause each avatar, or a selected set of avatars, associated with a selected set of global events from the global event list(s) 207 to be presented simultaneously and navigated along a respective path.

Figure 7:
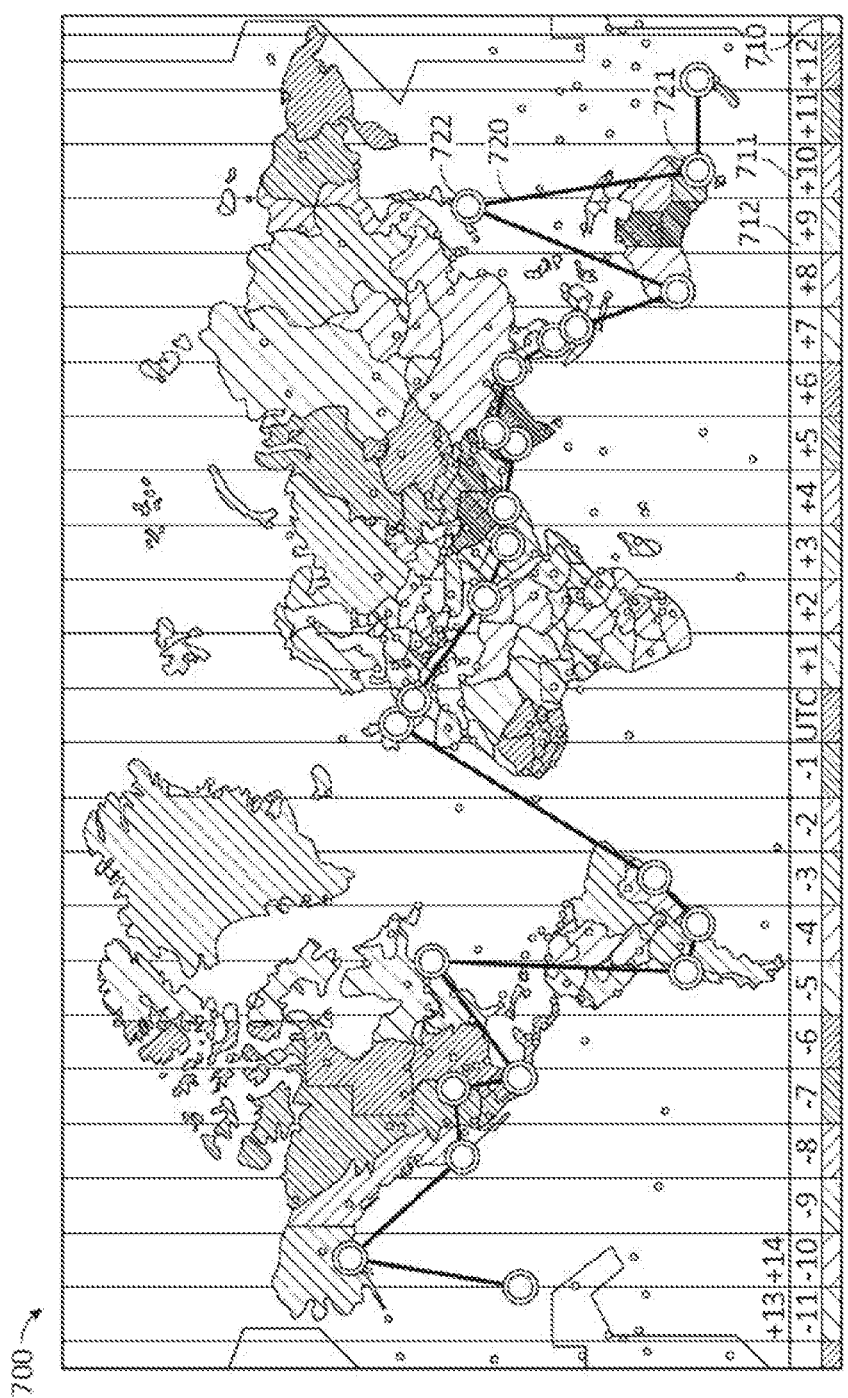
FIGS. 7, 8A and 8B are illustrative user interfaces of the global event avatar generation platform, according to example embodiments.

Time zone map 209 stores data representing time zones of the geographical regions used by the global event avatar generation platform 124. Specifically, time zone map 209 stores the latitude and longitude bounds of each geographical region and provides the offset from the UTC associated with the given region. Based on the offset from the UTC of a given region, the global event avatar generation platform 124 can compute the current time in the given region by subtracting or adding to the UTC the specified offset of the given geographical region. Specifically, the geographical region in the westernmost time zone uses UTC−12 (a negative 12 offset), being twelve hours behind UTC; the geographical region in the easternmost time zone uses UTC+14 (a positive 14 offset), being fourteen hours ahead of UTC. The time zone map 209 lists the geographical regions in sequential order according to their sequentially ordered time zones starting from UTC−12 to UTC+14. FIG. 7 shows a list of UTC offsets 710 that correspond to each geographical region on a map that is stored in time zone map 209. For example, a first region corresponding to point 721 has a first UTC offset 711 (+10) and a second adjacent region corresponding to point 722 has a second UTC offset 712 (+9) stored in the time zone map 209.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 103 have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 103 is located within a specific geographic location (e.g., a location where a given selected global event has begun) to contribute a particular video or clip.

Figure 3:
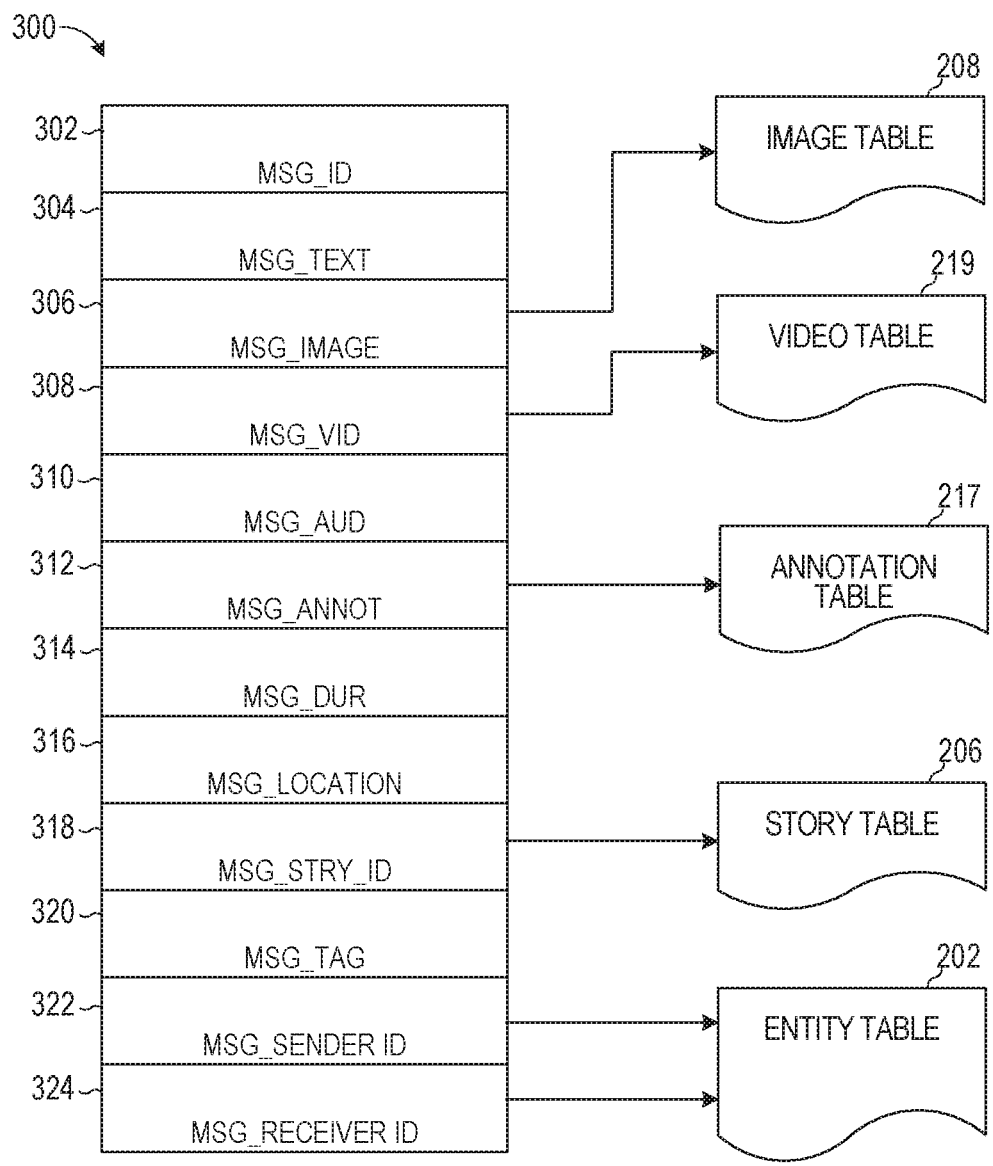
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 103 or the application server 112. The message 300 is shown to include the following components:

A message identifier 302: a unique identifier that identifies the message 300.

A message text payload 304: text, to be generated by a user via a UI of the client device 103 and that is included in the message 300.

A message image payload 306: image data, captured by a camera component of a client device 103 or retrieved from memory of a client device 103, and that is included in the message 300.

A message video payload 308: video data, captured by a camera component or retrieved from a memory component of the client device 103 and that is included in the message 300.

A message audio payload 310: audio data, captured by a microphone or retrieved from the memory component of the client device 103, and that is included in the message 300.

A message annotation 312: annotation data (e.g., filters, objects, captions, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 103 on which the message 300 was generated and from which the message 300 was sent.

A message receiver identifier 324: an identifier (e.g., a messaging system identifier, email address, or device identifier) indicative of user(s) of the client device 103 to which the message 300 is addressed. In the case of a conversation between multiple users, the identifier 324 may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 219, values stored within the message annotations 312 may point to data stored in an annotation table 217, values stored within the message story identifier 318 may point to data stored in a story table 206, and values stored within the message sender identifier 322 and the message receiver identifier 324 may point to user records stored within an entity table 202.

Figure 4:
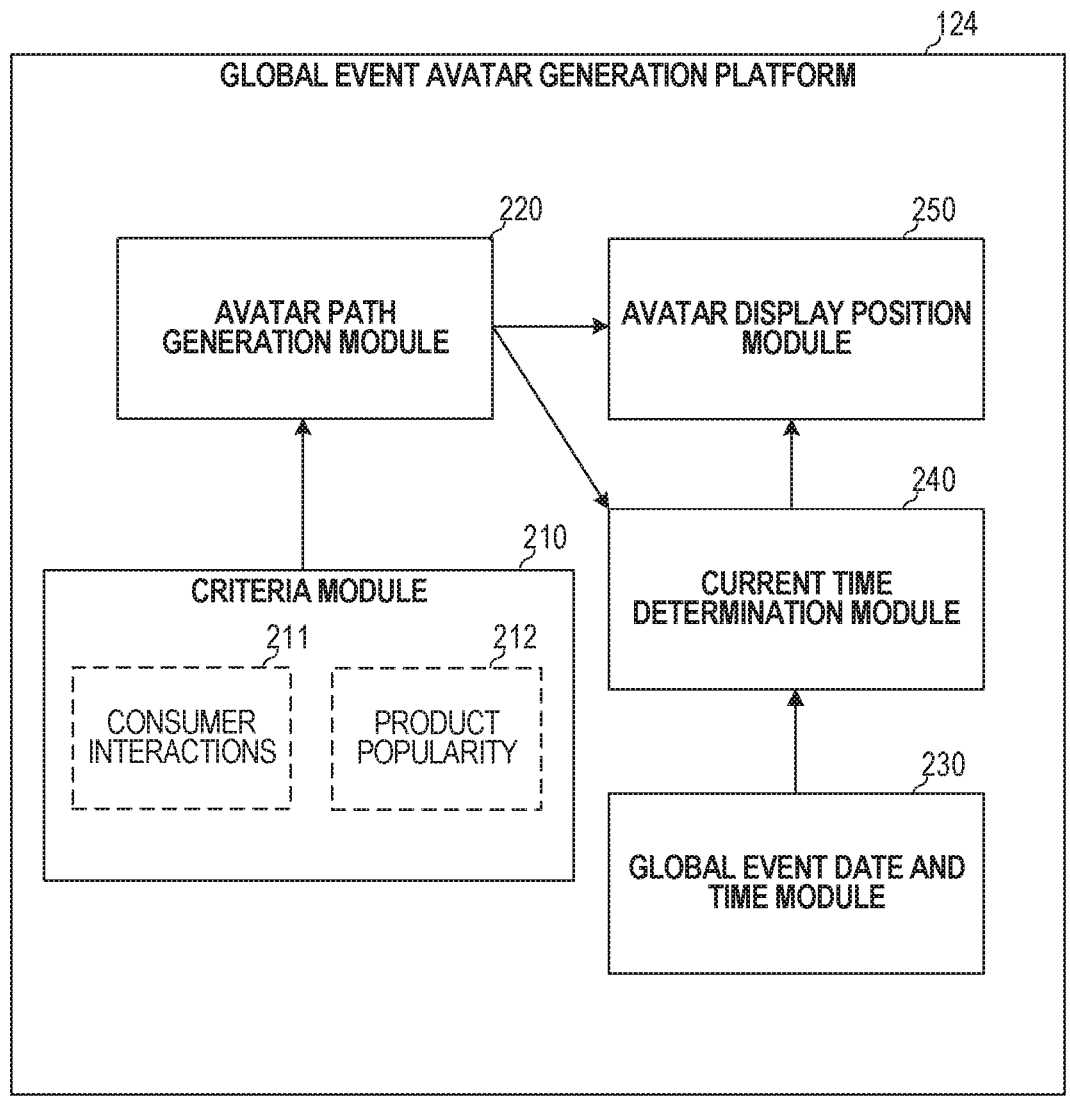
FIG. 4 is a block diagram showing an example global event avatar generation platform, according to example embodiments.

FIG. 4 is a block diagram showing an example global event avatar generation platform 124, according to example embodiments. Global event avatar generation platform 124 includes a criteria module 210, an avatar path generation module 220, an avatar display position module 250, global event date and time module 230, and a current time determination module 240.

Avatar path generation module 220 generates a path through each geographical region across the globe that an avatar representing a given global event takes. Specifically, the avatar follows the generated path through the geographical regions across the globe in a manner such that the avatar reaches each next point along the path when the specified global event begins at the corresponding next geographical region. An illustrative path provided by the avatar path generation module 220 is shown in FIG. 7. Specifically, the avatar may initially be positioned at a first point 721 corresponding to a city in Australia when the global event began in that city. The avatar is navigated along the path 720 to the next point 722 corresponding to a city in Japan so that the avatar reaches that next point 722 when the same global event begins in the city in Japan. While the global event also begins in other countries and cities that are in the same time zone as the city in Japan, corresponding to the next point 722, the avatar is only navigated to the specified next point 722. For example, a city in Russia may have the global event start at the same time as the city in Japan but the avatar follows the path such that it only is displayed over the city in Japan and not the city in Russia.

The selection of which cities of which countries to include in the path 720 (represented as points along the path 720) can be based on a number of criteria provided by criteria module 210. For example, criteria module 210 analyzes consumer interactions 211 and product popularity 212 across the globe. The criteria module 210 retrieves consumer interactions 211 and product popularity 212 from each country and city in a given time zone and determines which country and city is the most popular and has the most activity of the messaging client application 104. For example, if 10,000 users are accessing the messaging client application 104 daily or hourly from a city in Japan, but only 3,000 users are accessing the messaging client application 104 daily or hourly from a city in Russia that is in the same time zone as the city in Japan, the criteria module 210 selects the city in Japan for the avatar path generation module 220 to include in the avatar's path. Similarly, if 50,000 users are downloading or purchasing content on the messaging client application 104 daily or hourly from a city in Japan, but only 1,000 users are downloading or purchasing content on the messaging client application 104 daily or hourly from a city in Russia that is in the same time zone as the city in Japan, the criteria module 210 selects the city in Japan for avatar path generation module 220 to include in the avatar's path.

Global event date and time module 230 selects one or more global events from the global event list(s) 207 (FIG. 2). In some embodiments, the global event date and time module 230 selects the global event(s) in response to a user selection that is received from a given client device 103. For example, the global event date and time module 230 presents to a user at a client device 103 the total list of global event list(s) 207. The user selects one or more events from the presented list and in response, the global event date and time module 230 retrieves from the global event list(s) 207 the start time and start date of each selected global event. In some embodiments, the global event date and time module 230 accesses the global event list(s) 207 and by default automatically selects as the global event the global event that has a start date that is nearest to the current date. For example, if the current date is December 30, the global event date and time module 230 selects automatically the global event for New Year's Day as the global event used to generate the global event avatar display on the map.

Current time determination module 240 retrieves the current UTC time and the time offsets of each geographical location that is on the path provided by the avatar path generation module 220. Specifically, current time determination module 240 computes the current time in each geographical location by adding or subtracting the corresponding offset from the UTC specified for the geographical location by the time zone map 209. The current time determination module 240 compares the start time of the selected global event provided by the global event date and time module 230 to the current time of each geographical location. For example, the global event date and time module 230 provides the start time for the event as the specific UTC time of the event. The current time determination module 240 computes the current time in a given region (e.g., the region in the easternmost time zone) based on the current UTC time and the corresponding UTC offset for that region and determines whether the computed current UTC time in the region matches the specific UTC time of the global event. When the current time determination module 240 determines that the current UTC time in a given region matches the UTC time of the global event, the current time determination module 240 indicates to the avatar display position module 250 the geographical region (e.g., by latitude and longitude or by the specific point on the path provided by the avatar path generation module 220) where the global event has begun. The current time determination module 240 may perform this computation and comparison for each geographical region in specified time intervals (e.g., every 5 minutes) or in real-time (e.g., continuously).

For example, the current time determination module 240 retrieves the UTC offset 711 for a first geographical region corresponding to a first point 721 on path 720. The first geographical region may be selected by searching all of the geographical regions and identifying the geographical region having the earliest start time (e.g., the largest UTC offset) indicating that the global event will first begin in the identified geographical region before beginning in other regions. The current time determination module 240 computes the current time in the first geographical region by combining the retrieved UTC offset 711 with the current UTC time. The current time determination module 240 then compares that computed time with the UTC time indicated by the start time of the global event. When the times match, the current time determination module 240 determines that the global event has begun in the first geographical region and identifies the first point 721 to the avatar display position module 250. The current time determination module 240 computes the current time in a second geographical region by combining the retrieved UTC offset 712 with the current UTC time. The current time determination module 240 then compares that computed time with the UTC time indicated by the start time of the global event. When the times match, the current time determination module 240 determines that the global event has begun in the second geographical region and identifies the second point 722 to the avatar display position module 250.

In response to receiving the indication from the current time determination module 240 of the geographical region where the global event has begun, the avatar display position module 250 updates a display position on a map of the avatar corresponding to the global event. For example, the avatar display position module 250 navigates the avatar from the current position over a first geographical region (e.g., a city in Australia) to a new position over a second geographical region (e.g., a city in Japan) which has been indicated by the current time determination module 240 where the global event has begun. Illustrative screen 800 provided by the avatar display position module 250 is discussed below in connection with FIG. 8B. For example, the avatar display position module 250 presents a screen 830 showing an avatar 832 that includes a visual representation of the global event (e.g., a blimp with the new year 2019 depicted on the blimp when the global event is the 2019 New Year's Day) over the geographical position where the global event has begun as identified by the current time determination module 240.

In some embodiments, the avatar display position module 250 animates the displayed avatar in real-time or over specified time intervals to reposition the avatar closer to the next geographical region at a certain rate. Specifically, the avatar display position module 250 computes a distance between the current position of the avatar on the map and the next point on the path. If the distance is small, the avatar display position module 250 moves the position of the avatar at a slow rate. If the distance is large, the avatar display position module 250 moves the position of the avatar at a fast rate. The rate is computed to ensure that the avatar reaches the next point from the current position along the path at the beginning of the global event.

In some embodiments, the avatar display position module 250 presents an avatar in different states depending on how soon a given geographical region will reach the start time of a global event. For example, if a given geographical region is within a first threshold amount (e.g., 2 days away) from reaching the start of the global event, an avatar in a first state is presented at a position near or within a specified distance of the geographical region on the map. For example, the avatar display position module 250 presents a blimp floating in the water in a covered state 812 shown in screen 810. In some embodiments, the avatar is presented in the first state only when the global event has not begun in any of the geographical locations and when the first geographical location having the earliest time zone is within a specified time interval (e.g., 2 days) of the start time of the global event. If the given geographical region is then determined to be within a second threshold amount (e.g., 1 day away) from reaching the start of the global event, an avatar in a second state is presented at the position near or within the specified distance of the geographical region on the map. For example, the avatar display position module 250 presents a blimp on a raft or float in the water in an uncovered state 822 shown in screen 820. Once the given geographical region reaches the start of the global event, the avatar is navigated to the point within the geographical region and is presented in a third state. For example, the avatar display position module 250 presents the blimp flying in the avatar 832 shown in screen 830.

Figure 5:
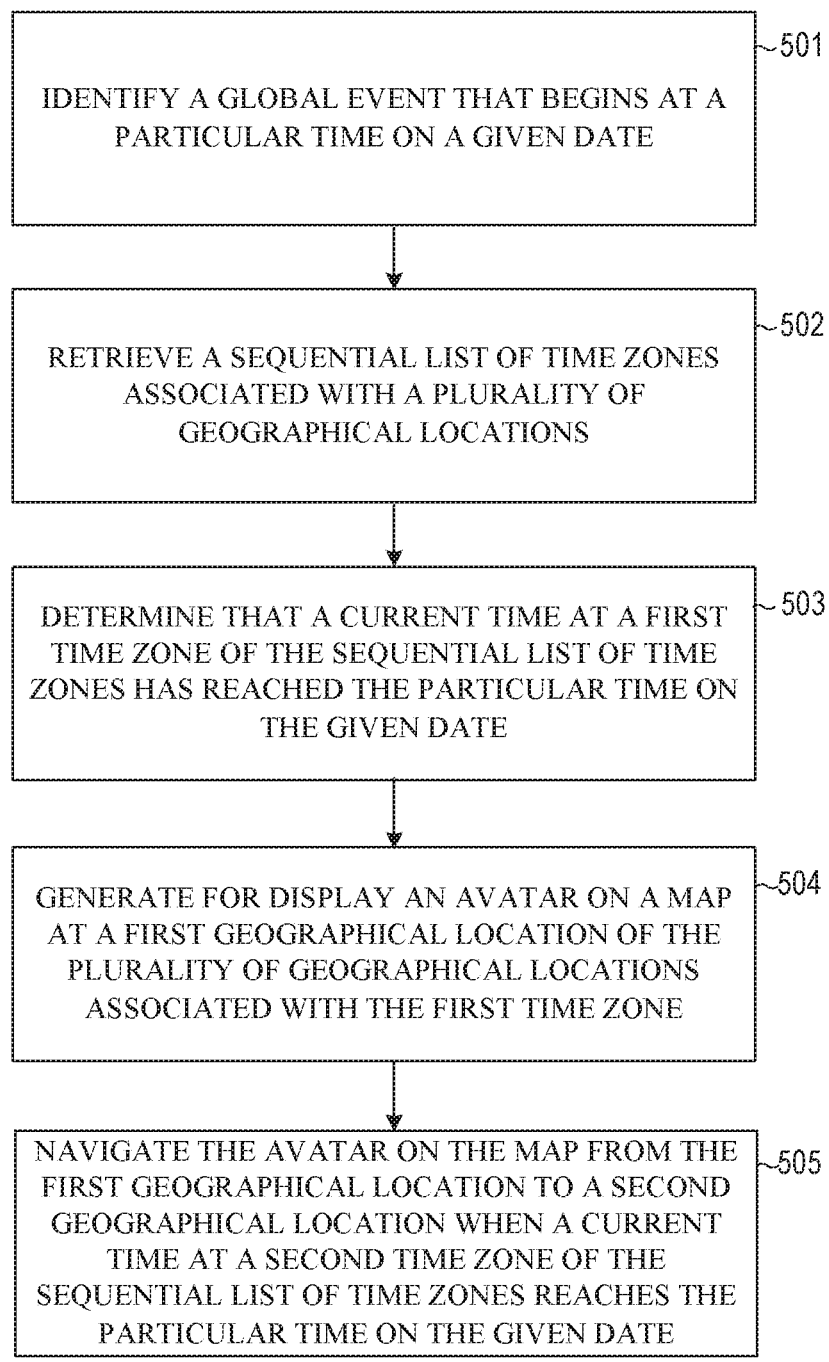
FIGS. 5-6 are flowcharts illustrating example operations of the global event avatar generation platform, according to example embodiments.
Figure 6:
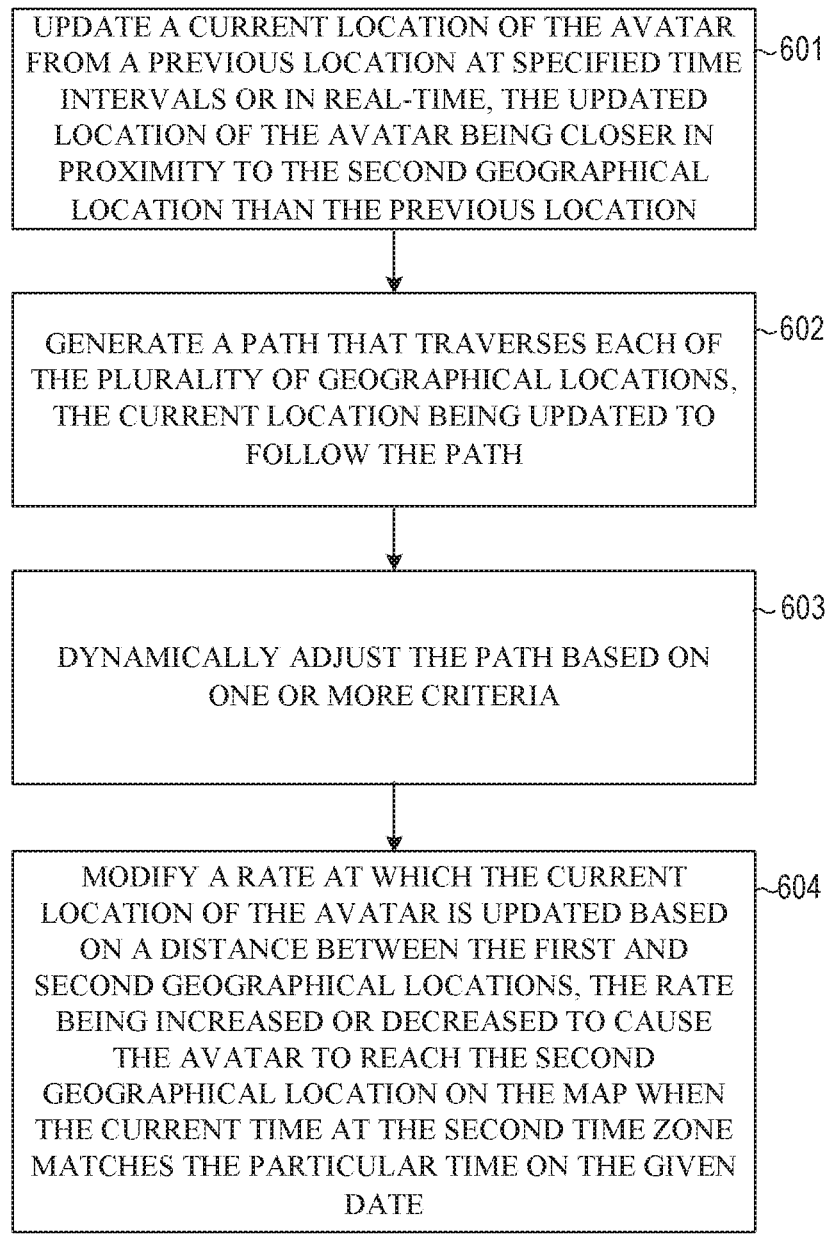

FIGS. 5-6 are flowcharts illustrating example operations of the global event avatar generation platform 124 in performing processes 500-600, according to example embodiments. The processes 500-600 may be embodied in computer-readable instructions for execution by one or more processors such that the operations of the processes 500-600 may be performed in part or in whole by the functional components of the messaging server system 108; accordingly, the processes 500-600 are described below by way of example with reference thereto. However, in other embodiments at least some of the operations of the processes 500-600 may be deployed on various other hardware configurations. The processes 500-600 are therefore not intended to be limited to the messaging server system 108 and can be implemented in whole, or in part, by any other component. The operations in the processes 500-600 can be performed in any order, in parallel, or may be entirely skipped and omitted.

At operation 501, the global event avatar generation platform 124 identifies a global event that begins at a particular time on a given date. For example, global event date and time module 230 receives a user selection of one or more global events from a global events list that is presented in a user interface. The global event date and time module 230 retrieves the start times and start dates of the selected global event(s) from the global event list(s) 207.

At operation 502, the global event avatar generation platform 124 retrieves a sequential list of time zones associated with a plurality of geographical locations. For example, the current time determination module 240 retrieves from the time zone map 209 a list of UTC offsets for each geographical region on a map.

At operation 503, the global event avatar generation platform 124 determines that a current time at a first time zone of the sequential list of time zones has reached the particular time on the given date. For example, the current time determination module 240 computes the current UTC time in a first geographical region by combining the corresponding UTC offset in the region to the current UTC time. The current time determination module 240 then compares the computed UTC time in the first geographical region to the UTC start time of each selected global event. When the computed UTC time in the first geographical region matches the UTC start time of the global event, the current time determination module 240 determines that the current time at the first time zone of the sequential list of time zones has reached the particular time on the given date.

At operation 504, the global event avatar generation platform 124 generates for display an avatar on a map at a first geographical location of the plurality of geographical locations associated with the first time zone. For example, avatar display position module 250 generates an avatar on a map (e.g., illustrated in screens 800 of FIG. 8B) based on the indication from current time determination module 240 of which of the geographical regions on the path has reached the start time of the global event.

At operation 505, the global event avatar generation platform 124 navigates the avatar on the map from the first geographical location to a second geographical location when a current time at a second time zone of the sequential list of time zones reaches the particular time on the given date. For example, when the current time determination module 240 determines that the global event has started in a second geographical location that is next or adjacent to the first geographical location, the indication of the second geographical location is provided to the avatar display position module 250. Avatar display position module 250 then updates or navigates and moves the avatar from being displayed in the first geographical region to being displayed in the second geographical region.

In FIG. 6, process 600 describes operations performed by the avatar path generation module 220 and the avatar display position module 250 to reposition and provide a path for the avatar to represent when a global event begins at a given geographical location. At operation 601, the global event avatar generation platform 124 updates a current location of the avatar from a previous location at specified time intervals or in real time, the updated location of the avatar being closer in proximity to the second geographical location than the previous location. For example, the avatar display position module 250 continuously or periodically updates the position of the avatar so it is moved closer and closer to the next adjacent geographical region and enters that geographical region when the global event begins in the geographical region.

At operation 602, the global event avatar generation platform 124 generates a path that traverses each of the plurality of geographical locations, the current location being updated to follow the path. For example, avatar path generation module 220 selects a point from each geographical region on the map associated with each different time zone. Specifically, avatar path generation module 220 selects a point for one city in each time zone on the time zone map 209 and then connects those points to form a path 720. The point that is selected for each geographical region or time zone to include in path 720 can be based on criteria provided by criteria module 210 or may be randomly selected.

At operation 603, the global event avatar generation platform 124 dynamically adjusts the path based on one or more criteria. For example, avatar path generation module 220 changes which point in a given geographical region to include in path 720 based on popularity of the messaging client application 104 in the given geographical region. For example, if 10,000 users access the messaging client application 104 in a city in Japan while 5,000 users access the messaging client application 104 in a city in Russia that is in the same time zone as the city in Japan, the path is adjusted to select the city in Japan to include as the point in the path rather than the city in Russia. If, after a certain time interval, the number of users in Russia exceeds the number of users in Japan who access the messaging client application 104, the avatar path generation module 220 changes the path 720 to move the point from corresponding to the city in Japan to being positioned over the city in Russia. This results in the avatar landing and being positioned over the city in Russia rather than the city in Japan when the global event begins in the time zone of the cities in Russia and Japan.

At operation 604, the global event avatar generation platform 124 modifies a rate at which the current location of the avatar is updated based on a distance between the first and second geographical locations, the rate being increased or decreased to cause the avatar to reach the second geographical location on the map when the current time at the second time zone matches the particular time on the given date. For example, the avatar display position module 250 animates the displayed avatar in real time or over specified time intervals to reposition the avatar closer to the next geographical region at a certain rate. Specifically, the avatar display position module 250 computes a distance between the current position of the avatar on the map and the next point on the path. If the distance is small, the avatar display position module 250 moves the position of the avatar at a slow rate. If the distance is large, the avatar display position module 250 moves the position of the avatar at a fast rate. The rate is computed to ensure that the avatar reaches the next point from the current position along the path at the beginning of the global event.

Figure 8A:
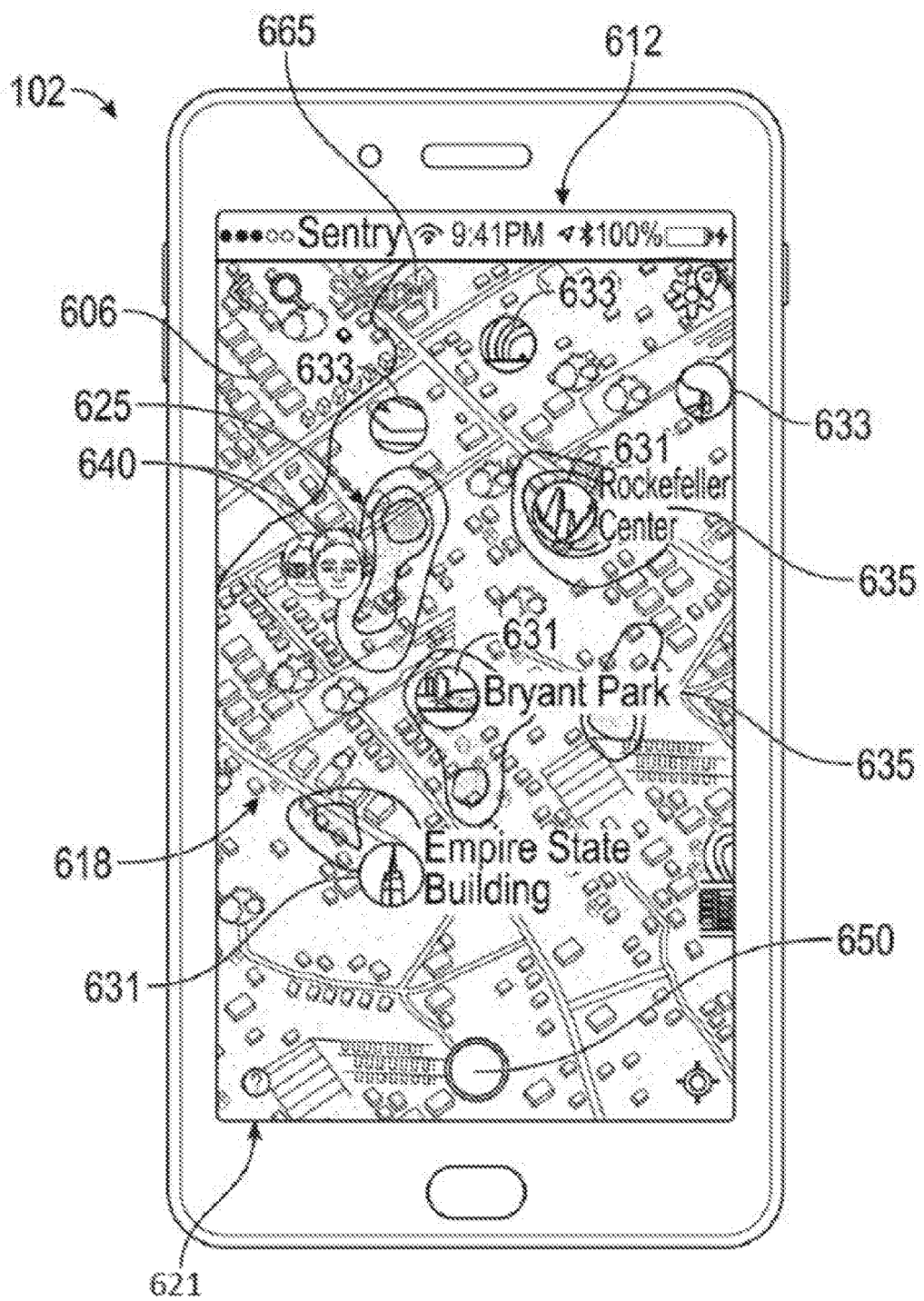

FIG. 8A shows an example embodiment of a map-based graphical user interface (GUI), further referred to as a map GUI 612, displayed on a user device in the example form of a mobile phone 102. In this example embodiment, the map GUI 612 is generated on a display in the form of a touchscreen 606 capable of receiving haptic input. The map GUI 612 includes a map 618 showing an aerial or satellite representation of a particular geographical area. The map 618 is displayed within a map viewport 621 which, in this example embodiment, uses the full available area of the touchscreen 606. In other example embodiments, the map viewport 621 may be a bounded panel or window within a larger display screen. The map GUI 612 further comprises a plurality of user-selectable graphical user interface elements displayed at specific respective geographic locations on the map. Each such geo-anchored GUI element is, in this example embodiment, represented by a respective indicium or icon overlaid on the map 618. The different types of icons and their respective functionalities will be described in greater detail below. One such functionality is the global event avatar that is discussed in connection with FIG. 8B where an avatar is positioned over a geographical region where a global event has begun. As will also be described briefly, the map GUI 612 may further include one or more informational overlays rendered over the underlying geographical map 618, the informational overlay in this example embodiment including a heatmap 625 representative of the geographical distribution of underlying social media activity on the social media platform provided by the relevant social media application. In this example embodiment, the social media platform to which the social media client application 104 executing on the mobile phone 102 provides access is SnapChat™ provided by Snap Inc.

As mentioned, the map GUI 612 includes a number of different user-selectable icons or UI elements that indicate different geographically-based content or information. These icons can include the global event avatar discussed below in connection with FIG. 8B. In this example embodiment, the map GUI 612 includes a plurality of different gallery icons (also referred to in this description as story icons). Each story icon corresponds in location on the map 618 to a respective location-based social media gallery; in this example embodiment, the icons correspond to a location-based story of ephemeral messages in the example form of so-called snaps, as discussed elsewhere herein. Each of these stories that are represented by a respective story icon on the map 618 consists of a respective set of snaps (respectively comprising augmented or unaugmented photographic or video content) that are grouped together based at least in part on respective geo-tag data associated with respective snaps. In an embodiment, the content of the location-based stories can only be populated once the geographical location corresponding to the location-based story has reached the start of a selected global event. The content of the location-based stories disappears and becomes inaccessible to a user after a specified time interval has elapsed since the global event began at the corresponding geographical location.

In the example embodiment of FIG. 8A, the map GUI 612 includes two different types of gallery icons for two different respective types of location-based social media galleries: place icons 631 for place galleries/stories and spike icons 633 for spike galleries/stories that are dynamically surfaced on the map GUI 612 based on one or more metrics of underlying social media activity relating to the submission of social media items/snaps to the social media platform with geo-tag data indicating the respectively associated geographical areas. Note that these different types of galleries are represented by different types of icons 631, 633. The map GUI 612 in this example embodiment further includes friend icons in the example form of bitmojis 640 (or friend avatars) that are displayed on the map GUI 612 based on the current or last known geographic location of respective friends of the user associated with the client device 102.

In this example embodiment, the social media items that are selectively playable by selection of the corresponding story icons 631, 633 in the map GUI 612 are ephemeral social media items or messages. Ephemeral content is social media content (e.g., augmented and/or unaugmented video clips, pictures, and/or other messages) that is available for viewing by social media users via the map GUI 612 for only a predetermined limited period, also referred to herein as a respective gallery participation parameter or timer. After expiry of a respective gallery participation parameter or timer for any ephemeral message or snap uploaded by a particular user, that ephemeral message or snap is no longer available for viewing by other users via the map GUI 612 generated on their respective client devices 103 (such as mobile phone 102). Current examples of such ephemeral social media content include the respective snaps or messages included in so-called Stories in the SNAPCHAT or the INSTAGRAM social media applications.

Instead, or in addition, to management of ephemerality on a per-snap level using respective gallery participation timers, availability of the ephemeral messages by the map GUI 612 can in some instances be managed collectively (e.g., on a per-story level). In such instances, each story or gallery can have a respective story duration parameter, at the expiry of which availability of the corresponding story for viewing via map GUI 612 is terminated. In some embodiments, the story duration parameter is calculated based on the story participation parameter of one of the ephemeral messages included in the relevant story. For example, a story may, in some embodiments, expire when a last uploaded item within the story expires, responsive to which the corresponding story icon 631/633 is no longer displayed on the map GUI 612. In one example embodiment, the map GUI 612 may include one or more event icons (e.g., similar in appearance to the place icons 631 of FIG. 8A) corresponding to respective event stories, with the story duration parameter of the event story being set to expire a predetermined period of time from a start or conclusion of the underlying event. At expiry of the story duration parameter, the corresponding gallery icon is removed from the map GUI 612, irrespective of individual timers associated with respective snaps included in the event story.

The user can select any one of the gallery icons 631, 633 or the global event avatar discussed in connection with FIG. 8B by haptic contact with the touchscreen 606 at the onscreen location of the selected gallery icon 631/633 or the global event avatar. Responsive to such selection, automated sequential playback of the corresponding set of ephemeral messages or snaps in the selected story is performed by the mobile phone 102 on the touchscreen 606. In an embodiment, the set of ephemeral messages or snaps in the selected story that are sequentially played back include any content or only videos submitted to the global event avatar generation platform 124 from users who are geographically located in a time zone(s) or geographical region(s) where the global event has already begun. In an embodiment, the set of ephemeral messages or snaps in the selected story that are sequentially played back include any content or only videos submitted to the global event avatar generation platform 124 from users who are geographically located in a time zone or geographical region where the global event has most recently already begun. Such automated sequential reproduction of the selected story consists of:

displaying on the touchscreen 606 the content or media payload of a first one of the ephemeral messages for a corresponding display duration (e.g., a default value of five seconds for photo-based messages and a maximum value of 10 seconds for video-based snaps), which, in this example embodiment, temporarily replaces the map GUI 612 on the touchscreen 606 with a full-screen replay of the relevant snap;

at expiry of the display duration, ceasing display of the content of the first of ephemeral message, and then displaying the content of the next snap/message for its respective display duration; and thus progressing in sequence through all of the ephemeral messages in the selected story until all of the snaps in the story have been replayed or until the user selectively dismisses the playback sequence.

In some embodiments, not all of the snaps in a particular story/gallery are necessarily included in the replay sequence. For example, if there are many overlapping snaps (e.g., snaps showing substantially identical content), some of those snaps are automatically skipped to keep a continuous narrative and not repeat some sections of an event commonly captured by the different snaps. Instead, or in addition, the social media server application 114 can, in some embodiments, be programmed to automatically identify and curate overlapping or contemporaneous snaps based on timestamp information associated with respective snaps.

In this example embodiment, the snaps automatically collected together in a replayable spike story or place story are arranged automatically to be played back in chronological order based on respective timestamps (i.e., being played in sequence from oldest to newest or earliest posted to most recently posted). A benefit of such chronological playback is that viewing of the story provides a user with sequentially arranged views of events transpiring at the relevant location. In some instances, however, a human curator may choose to rearrange snaps out of chronological order (for example, to improve the narrative flow of the story). In other embodiments, the snaps may be played in reverse chronological order, from newest to oldest.

It can thus be seen that the example map GUI 612 includes multiple location-based gallery icons in the example form of story icons 631, 633 that are user-selectable to trigger playback of respective collections of ephemeral social media items, in this example embodiment being respective ephemeral stories consisting of respective sets of ephemeral messages (also referred to in this description as snaps). In this example embodiment, each of the plurality of location-based stories represented by the respective story icons 631, 633 may comprise media content contributed by multiple different users.

The respective ephemeral stories are, in this example embodiment, compiled from ephemeral messages submitted by multiple users based at least in part on geo-tagging of the respective snaps. Note that the ephemeral messages made available for viewing via the map GUI 612 are, in this example embodiment, not limited to content provided by other users who are members of an in-application social network of the user on whose mobile phone 102 the map GUI 612 is generated. Instead, the social media content to which the map GUI 612 allows access is, in this example embodiment, provided by snaps uploaded or submitted by any user to be publicly accessible via the map GUI 612.

One aspect of the example map GUI 612 provides for the functionality for users to submit social media content that is publicly viewable via the map GUI 612. In this example embodiment, snaps can be captured via the map GUI 612 while the map viewport 621 is displayed (as seen in FIG. 8A) by operation of a camera soft button 650 (FIG. 8A) forming part of the map GUI 612. After capturing of photo or video content by operation of the camera soft button 650, the captured media content is displayed on the touchscreen 606. In this example embodiment, the user can select one or both destination options as "My Story" and "Our Story". By selecting Our Story and thereafter selecting a "Send" soft button, the snap is submitted over the network 106 to the application server 112 with an indication that the snap is available for non-private publication via the map GUI 612. If the snap is not so marked by the user (if, for example, only the My Story radio button is selected), then the snap is not available for inclusion in any of the stories associated with the story icons 631, 633 and is not available for inclusion in search results of a location-based search via the map GUI 612, as described later herein. Snaps included only in the My Story gallery are available only to friends of the user (e.g., members of the uploading user's social network). The My Story gallery is a per-user, location-agnostic gallery of ephemeral messages available to friend users only, and is thus a non-public/private gallery.

In other example embodiments described herein, the superset of ephemeral messages made available by multiple users for public viewing via the map GUI 612 is alternatively referred to as the "Live Story" or simply as a "Live" gallery. For the purposes of the description of example embodiments herein, Live and Our Story are thus to be read as being synonymous. In the present example embodiment, the compilation and/or surfacing of gallery icons 631, 633, and the rendering of the heatmap 625 are based exclusively on publicly available social media content provided by snaps uploaded to Our Story. Calculation of metrics or attributes of social media activity upon which one or more aspects of the map GUI 612 are based (e.g., an unusualness or anomaly metric indicating geo-temporal unusualness or anomaly of social media activity within respective geographical areas) is, in this example embodiment, likewise based exclusively on snaps uploaded to Our Story.

In addition to viewing clustered stories by selection of the story icons 631, 633, the user can access snaps by use of one or more search functionalities provided by the map GUI 612. In this example embodiment, the map GUI 612 provides two separate search mechanisms, namely a search box 665 (FIG. 8A) and a location-based search by clicking or tapping at a target location on the map 618.

Responsive to entry of a text search query in the search box 665, search results are, in this example embodiment, displayed in a search box drop-down in which individual cells correspond to individual snaps, stories, places, and/or users returned in the search. When the user clicks on a selected cell in the search box drop-down, the map GUI 612 in this example automatically navigates with a fly-over to the point on the map, after which the selected story or spike cluster starts playing, or a friend bubble pops up, as the case may be. In some embodiments, at least some aspects of the text-based query are limited to the geographical area currently displayed in the map viewport 621. Instead, or in addition, some aspects of the text-based query may be location-agnostic, returning search results from any location.

As an alternative to entering a text-based search query, the user can initiate a location-based search by clicking or tapping on a particular location on the map viewport 621, responsive to which a search is conducted for social media items within a predefined radius from the click or tap location. In this example embodiment, such a location-based search does not return a list of graphical user interface elements that are selectable to play respective items, but instead automatically triggers automated sequential replay returned as a result of the search. Thus, clicking or tapping on a non-thumbnail place on the map 618 will radiate out a search around the tap location. Such a location-based search can have a predefined search radius from the tap location. If any snaps are found, they are automatically played back in sequence, as described before. If there are no snaps in that area, the search bounces back to show no results found.

In embodiments in which the map GUI 612 is displayed on a touchscreen 606, a geo-temporal search is triggered by haptic contact at a particular location within the map 618, with the search being geographically centered on the location of the haptic contact. An input interval indicated by the time period for which the haptic contact is maintained with the touchscreen automatically determines the preceding time period with respect to which the search is carried out. In such a case, for example, a tap on the screen triggers a geo-temporal search for material within the default time period, while a press and hold automatically triggers a geo-temporal search for material within an extended time period which is longer than the default time period. Instead, or in addition, the search radius may be variable based on the length of the input interval, with longer input intervals (i.e., a longer hold period) corresponding to a larger search radius.

In use, the map GUI 612 thus surfaces different types of location-based stories, which the user can view from the map 618. In the example embodiment of FIGS. 8A and 8B, the user can access, via the map GUI 612, snaps posted to Our Story from anywhere in the world. This can be achieved by navigating to different geographical areas displayed within the map viewport 621. In particular, the displayed geographical area can be changed by zooming in or zooming out and by moving the focus area of the map viewport 621. In the example embodiments of FIGS. 8A and 8B, in which the map GUI 612 is provided on a touchscreen 606, zooming in and zooming out can be achieved by haptic gestures in the form of a pinch-out or a pinch-in haptic input. Movement of the map 618 within the map viewport 621, so as to change the displayed geographical area, is achieved by a haptic dragging gesture at any point on the map 618.

In this example embodiment, the map 618 is not selectively rotatable by the user, having a fixed default orientation relative to the touchscreen 606. In other embodiments, the map 618 may have a fixed orientation relative to the Earth. In some embodiments, the map 618 is selectively rotatable, e.g., with all map content rotating around a fixed anchor.

As discussed at length above, in any particular map viewport 621, the displayed information can include:
- the color-coded heatmap 625, visually displaying the geographical distribution of snap uploading activity within a preceding window (for example the default snap lifetime, which in this example is 24 hours), allowing the user readily to identify places with more activity or less activity. This enables the user to more effectively target location-based searches via the map GUI 612. In some embodiments, the color-coded heatmap 625 is shown only at a highest level of magnification. In this example embodiment, however, the map 618 is rendered at all zoom levels.
- thumbnail icons 631, 633 for surfaced content forming part of ephemeral galleries or Stories. As described previously, these include, in this example embodiment, place icons 631 for geo-anchored stories associated with particular labeled locations, and spike icons 633 for location-based stories surfaced based on anomalous levels of geo-spatial activity.
- friend bitmojis 640 of friend users most frequently contacted by the user who is logged into the social media client application 104 executing on the client device 103 (e.g., mobile phone 102) and by which the map GUI 612 is generated.

In some embodiments, no spike icons 633 are shown at some levels of magnification. In a particular example embodiment, no spike icons 633 are shown at the original zoom level at which the map GUI 612 loads by default. In such an example, only the heatmap 625, friend bitmojis 640, a global event avatar, and a number of place icons 631 are displayed on the map 618 at the original zoom level. As the user zooms in, spike icons 633 are surfaced, representing respective clusters of activity.

It will be appreciated that different icons 631, 633 are surfaced at different zoom levels. In this example embodiment, the map GUI 612 displays no more than a predefined maximum number of place icons 631 and no more than a predefined maximum number of spike icons 633 in any particular view. For example, at any zoom level, the top three place stories (ranked by snap volume) are surfaced by displaying respective place icons 631 in the map viewport 621. Likewise, at any zoom level, the top three spike stories (ranked by anomaly or unusualness metric value) are surfaced by displaying respective spike icons 633 in the map viewport 621.

In addition to viewing stories surfaced in the map 618 by respective story icons 631, 633, the user can use one or more of the search functionalities described above to access any snap uploaded to Our Story and whose gallery participation timer or availability lifetime has not yet expired.

It will be appreciated that the map GUI 612 is dynamic, in that the information displayed therein changes dynamically with time. New snaps may continually be uploaded to Our Story, while the underlying social media items upon which surfacing of the story icons 631, 633 and generation of the heatmap 625 are based may further continually change due to the expiration of the availability of snaps. In this example embodiment, however, the information displayed in the map viewport 621 is not dynamically updated during display of any particular geographical area. Instead, changing of the focus of the map viewport 621 is associated with receiving updated information with respect to the story icons 631, 633 and heatmap 625 from the application server 112.

A benefit of the map GUI 612 as described with the example embodiments is that it provides for user-friendly and intuitive interaction with geographically distributed social media content. The provision of different types of social media galleries (e.g., represented respectively by spike icons 633 and place icons 631) provides a system that automatically surfaces the most relevant content for user-selection in such a manner that the very large number of individual social media items that may be available via a social media platform is reduced in complexity and allows selection of targeted content in which the user might be interested.

Further features of the map GUI 612 are discussed in commonly-owned, commonly-assigned U.S. patent application Ser. No. 15/965,361, filed Apr. 27, 2018, which is incorporated by reference herein in its entirety.

Figure 8B:
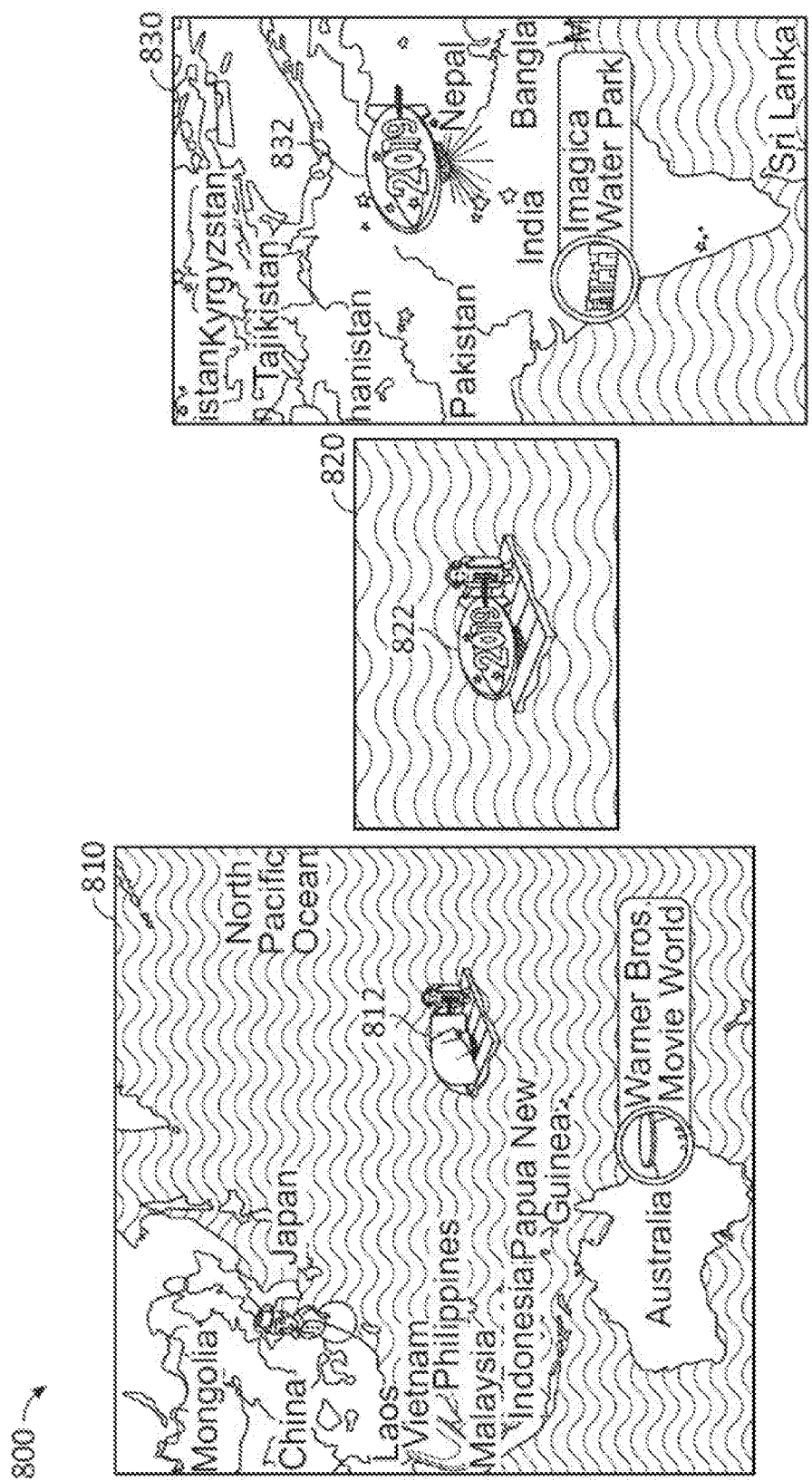

FIG. 8B is another version of the graphical map-based interface shown in FIG. 8A which is similar to the interface shown in FIG. 8A but has a global event avatar functionality. As shown in screens 800, an avatar is presented in a given geographical region. The user can interact with the avatar to send messages to friends in the geographical region and/or to view videos submitted by users in that geographical region or by users in other regions where the global event has begun. For example, in response to receiving a user selection of avatar 832, a list of friends of the user that live or are located within the geographical region, or within the time zone corresponding to the geographical region where the avatar 832 is positioned, is retrieved. The user can select any one or more of the users in the list to send a special message to the users. In some embodiments, the message may be pre-generated for the user or a list of pre-generated messages can be generated for the user to choose based on popular messages that are exchanged in relation to the global event represented by the avatar 832. The user can then select one of the messages or compose their own message to send to the friends in the region the user selects.

In an embodiment, in response to receiving a user selection of avatar 832, a list of videos submitted by users in the region over which the avatar is positioned and/or by users located in the time zone corresponding to the region over which the avatar is positioned is retrieved. In some embodiments, additional videos are retrieved from users who are located in regions associated with time zones that precede the time zone over which the avatar 832 is currently positioned (e.g., regions where the global event has already begun). The videos are presented to the user in response to the user selecting the avatar 832. In some embodiments, the videos are sequentially played back one after another in response to receiving the user selection of the avatar 832. The user may limit the videos that are sequentially played back to those videos that were provided by the user's friends on a social media platform. Alternatively, the user may request to have any video submitted by any user on the social media platform (not limited to the user's friends) to be randomly or pseudo-randomly selected and sequentially played back.

In an embodiment, the videos that are included in the list are ephemeral and limited to those videos that are submitted by users within a specified time interval (e.g., within 24 hours) of when the global event began at their locations. Specifically, the videos may become unavailable for access after a specified time interval has elapsed since the global event began at the geographical region or time zone of users from whom the corresponding videos were received.

Figure 9:
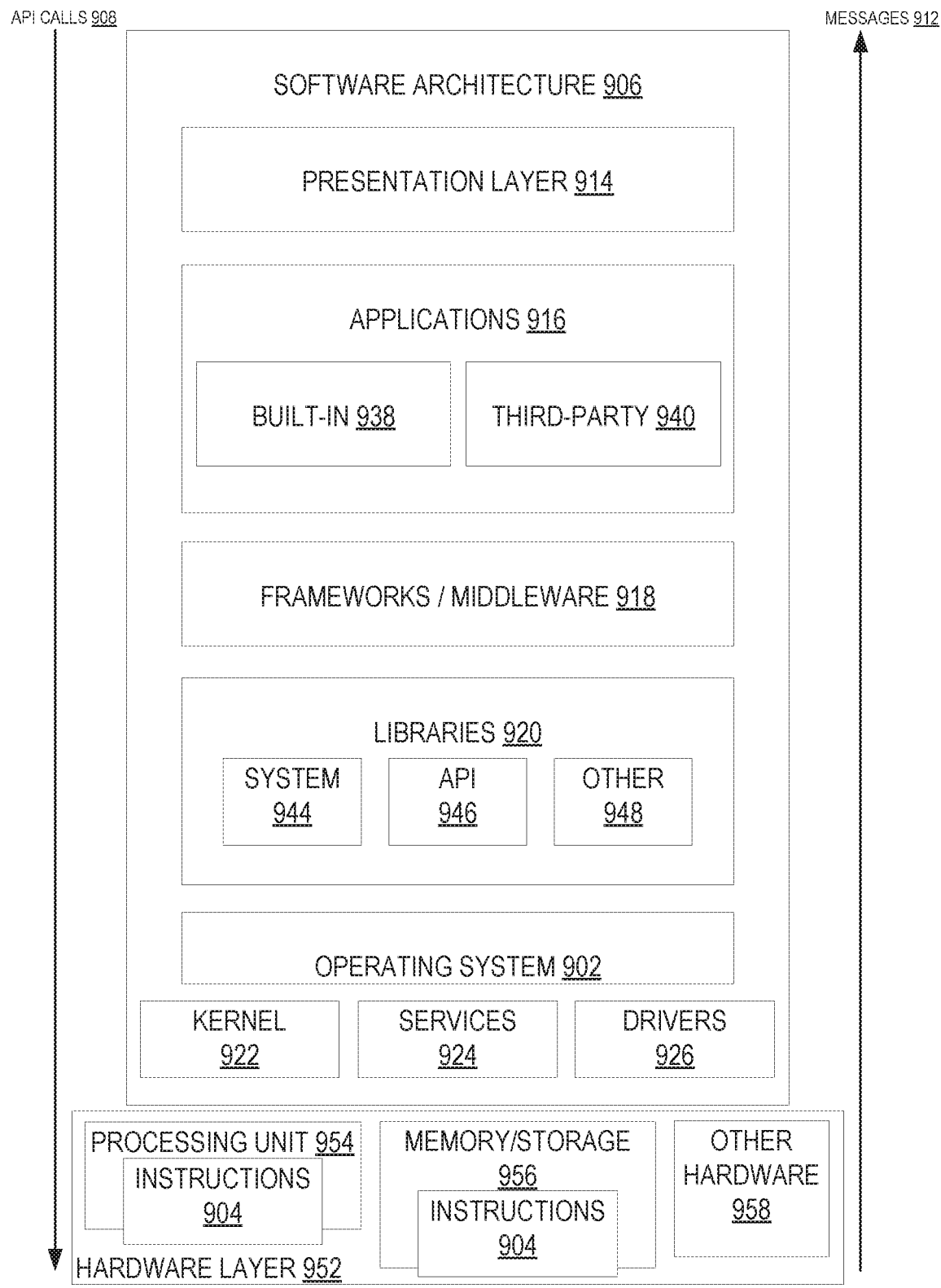
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems 902 may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional media in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
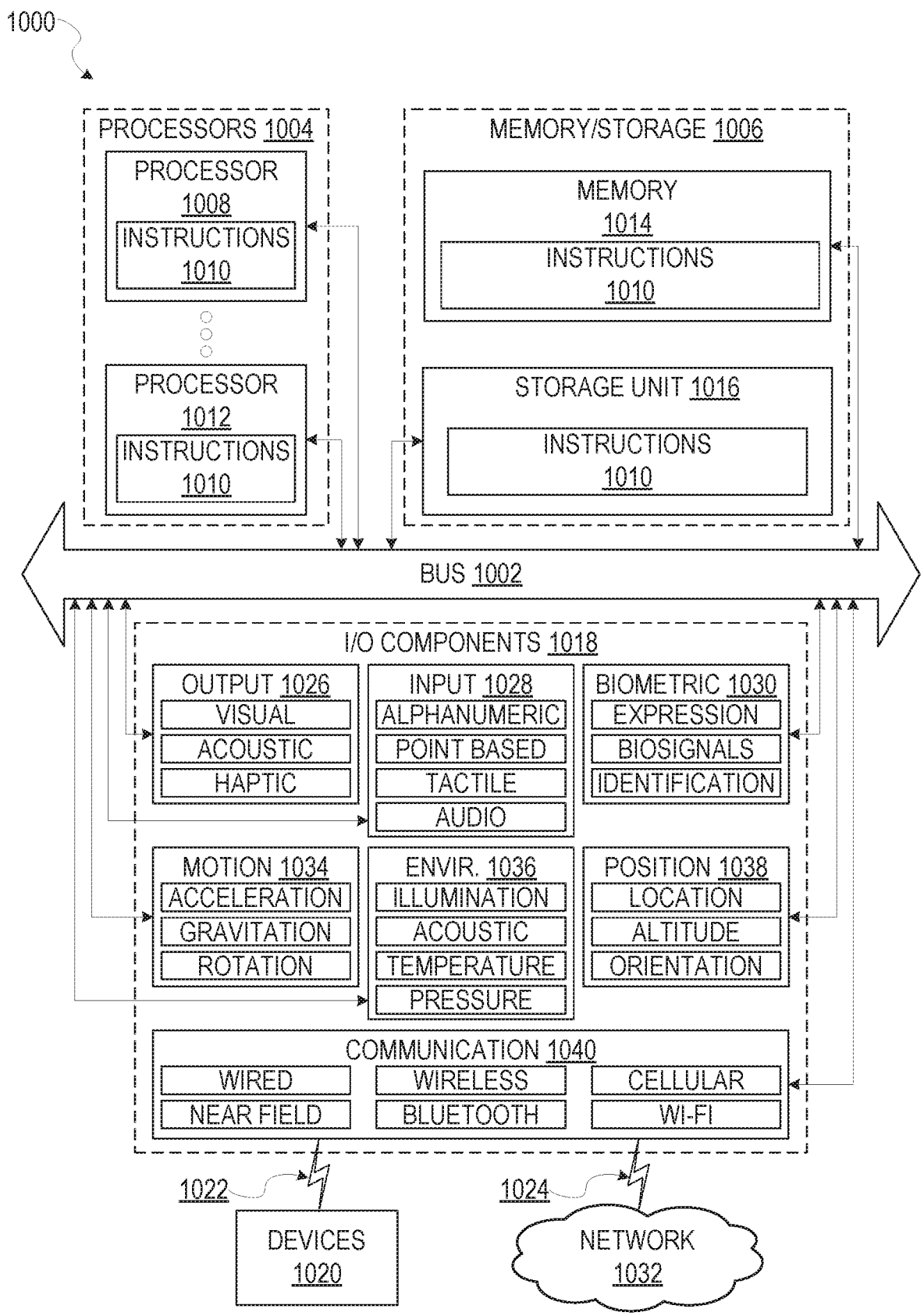
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions 1010 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010, embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL", in this context, refers to any intangible medium that is capable of storing, encoding, or carrying transitory or non-transitory instructions 1010 for execution by the machine 1000, and includes digital or analog communications signals or other intangible medium to facilitate communication of such instructions 1010. Instructions 1010 may be transmitted or received over the network 1032 using a transitory or non-transitory transmission medium via a network interface device and using any one of a number of well-known transfer protocols.

"CLIENT DEVICE", in this context, refers to any machine 1000 that interfaces to a communications network 1032 to obtain resources from one or more server systems or other client devices 103. A client device 103 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 1032.

"COMMUNICATIONS NETWORK", in this context, refers to one or more portions of a network 1032 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE", in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM", in this context, refers to a component, device, or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1010.

The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT", in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR", in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

"TIMESTAMP", in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    identifying, by one or more processors, a global event that begins at a particular time on a given date;
    receiving, at a current time, a user selection of an avatar while the avatar is at a first geographical location;
    determining a position of the avatar prior to being generated for display at the first geographical location, the determined position corresponding to a time prior to the current time; and
    in response to receiving the user selection of the avatar while the avatar is at the first geographical location, generating for display a video from a set of videos received from users at the determined position of the avatar, the set of videos being received from the users, during the time prior to the current time and prior to the avatar being progressed from the determined position to the first geographical location.

2. The method of claim 1, further comprising:
    retrieving a sequential list of time zones associated with a plurality of geographical locations;
    determining that a current time at a first time zone of the sequential list of time zones has reached the particular time on the given date; and
    in response to determining that the current time at the first time zone has reached the particular time on the given date, generating for display an avatar representative of the global event on a map at the first geographical location of the plurality of geographical locations associated with the first time zone.

3. The method of claim 2, further comprising:
    navigating the avatar on the map from the first geographical location to a second geographical location of the plurality of geographical locations when a current time at a second time zone of the sequential list of time zones, associated with the second geographical location, reaches the particular time on the given date.

4. The method of claim 1, wherein identifying the global event comprises receiving a user selection of the global event from a list of global events, and wherein the avatar is displayed on an interactive map interface for a social media platform.

5. The method of claim 1, further comprising retrieving a sequential list of time zones including a plurality of time offsets relative to a Coordinated Universal Time (UTC).

6. The method of claim 5 further comprising:
    searching for a first time offset of the plurality of time offsets that is earlier than each of the plurality of time offsets, the first time offset corresponding to the first geographical location; and
    computing the current time at the first geographical location by adding or subtracting the determined offset to or from the UTC.

7. The method of claim 1, further comprising updating a current location of the avatar from a previous location that is displayed on a map at specified time intervals or in real time, wherein the updated location of the avatar is closer in proximity to the first geographical location than the previous location.

8. The method of claim 7 further comprising generating a path that traverses each of a plurality of geographical locations, wherein the current location is updated to follow the path.

9. The method of claim 8 further comprising dynamically adjusting the path based on one or more criteria.

10. The method of claim 7 further comprising:
    determining a distance between the first geographical location and a second geographical locations; and
    modifying a rate at which the current location of the avatar is updated based on the determined distance.

11. The method of claim 10, wherein the rate is increased or decreased to cause the avatar to reach the second geographical location on the map when a current time at the second geographical location matches the particular time on the given date.

12. The method of claim 1, wherein the avatar comprises a blimp with an image or video that represents the global event, further comprising animating the avatar.

13. The method of claim 1, wherein the set of videos correspond to videos received from friends of the user on a social media platform, further comprising sequentially playing back, in response to receiving the user selection, each video in the set of videos automatically, and wherein a collection of videos in the set of videos received from users at a second geographical location corresponding to the position of the avatar are temporarily stored such that the collection of videos becomes unavailable for access after a specified time period has elapsed since the global event began at the second geographical location.

14. The method of claim 1, wherein the avatar includes a plurality of states, further comprising:
    prior to any time zone in a sequential list of time zones reaching the particular time on the given date, generating for display the avatar in a first state of the plurality of states on a map in close proximity to the first geographical location; and
    when the first time zone reaches the particular time on the given date;
    repositioning the avatar from being positioned in close proximity to the first geographical location to being positioned within the first geographical location; and
    changing a state of the avatar from the first state to a second of the plurality of states.

15. The method of claim 1 further comprising:
    determining that the current time at the first geographical location is earlier than the particular time on the given date by a first threshold amount;
    while that the current time at the first geographical location is earlier than the particular time on the given date by the first threshold amount, generating for display the avatar in a first state in close proximity to the first geographical location;

determining that the current time at the first geographical location is earlier than the particular time on the given date by a second threshold amount that is less than the first threshold amount; and in response to determining that the current time at the first geographical location is earlier than the particular time on the given date by the second threshold amount, modifying the state of the avatar from the first state to a second state.

16. A system comprising:

a processor configured to perform operations comprising:

identifying a global event that begins at a particular time on a given date;

receiving, at a current time, a user selection of an avatar while the avatar is at a first geographical location;

determining a position of the avatar prior to being generated for display at the first geographical location, the determined position corresponding to a time prior to the current time; and in response to receiving the user selection of the avatar while the avatar is at the first geographical location, generating for display a video from a set of videos received from users at the determined position of the avatar, the set of videos being received from the users, during the time prior to the current time and prior to the avatar being progressed from the determined position to the first geographical location.

17. The method of claim 1, further comprising sequentially playing back, in response to receiving the user selection, each video in the set of videos automatically.

18. The method of claim 1, wherein a collection of videos in the set of videos are received from the users at a second geographical location corresponding to the position of the avatar, the collection of videos being temporarily stored and becoming unavailable for access after a specified time period has elapsed since the global event began at the second geographical location.

19. The system of claim 16, wherein identifying the global event comprises receiving a user selection of the global event from a list of global events, and wherein the avatar is displayed on an interactive map interface for a social media platform.

20. A non-transitory machine-readable storage medium that includes instructions that, when executed by one or more processors of a machine, cause the machine to perform operations comprising:

identifying a global event that begins at a particular time on a given date;

receiving, at a current time, a user selection of an avatar while the avatar is at a first geographical location;

determining a position of the avatar prior to being generated for display at the first geographical location, the determined position corresponding to a time prior to the current time; and in response to receiving the user selection of the avatar while the avatar is at the first geographical location, generating for display a video from a set of videos received from users at the determined position of the avatar, the set of videos being received from the users during the time prior to the current time and prior to the avatar being progressed from the determined position to the first geographical location.

* * * * *

UNITED STATES PATENT AND TRADEMARK OFFICE
CERTIFICATE OF CORRECTION

PATENT NO. : 11,010,022 B2  
APPLICATION NO. : 16/845360  
DATED : May 18, 2021  
INVENTOR(S) : Alvi et al.

Page 1 of 1

It is certified that error appears in the above-identified patent and that said Letters Patent is hereby corrected as shown below:

In the Claims

In Column 32, Line 29, in Claim 20, delete "users" and insert --users,-- therefor Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*